United States Patent
Nakayama et al.

[11] Patent Number: 5,220,550
[45] Date of Patent: Jun. 15, 1993

[54] OPTICAL BEAM SYSTEM FOR OPTICAL DISK DRIVES

[75] Inventors: Masaru Nakayama; Harutaka Sekiya, both of Kakuda; Ichiro Morishita, Sendai, all of Japan

[73] Assignee: Alps Electric Co., Ltd., Tokyo, Japan

[21] Appl. No.: 735,984

[22] Filed: Jul. 25, 1991

[30] Foreign Application Priority Data

Aug. 10, 1990 [JP] Japan .................. 2-211822

[51] Int. Cl.⁵ .............................. G11B 7/00
[52] U.S. Cl. .................. 369/44.14; 369/44.17
[58] Field of Search ............ 350/6.9, 6.91; 359/220, 359/221; 369/44.14, 44.21, 44.23, 44.25, 112, 111

[56] References Cited

U.S. PATENT DOCUMENTS

| | | | |
|---|---|---|---|
| 4,621,353 | 11/1986 | Hazel et al. | |
| 4,796,098 | 1/1989 | Giddings | 369/275.3 |
| 4,838,632 | 6/1989 | Manian | 350/6.91 |
| 5,031,165 | 7/1991 | Fujita | 369/44.11 |
| 5,140,572 | 8/1992 | Kibune et al. | |

FOREIGN PATENT DOCUMENTS 276135  3/1990  Japan ................ 369/44.22

Primary Examiner—Aristotelis Psitos
Assistant Examiner—P. W. Huber
Attorney, Agent, or Firm—Guy W. Shoup; David W. Heid

[57] ABSTRACT

An optical system comprises an objective lens for moving along a recording face of an optical disk in the radial direction of the optical disk so that an optical axis thereof is almost perpendicular to the recording face, a reflecting mirror for moving together with the objective lens and whose reflecting axis extends in the radial direction, a detection optical unit, a movable mirror located to incline with respect to the optical axis extending almost parallel to the recording face from the detection optical unit and the reflecting axis of the reflecting mirror, and a mirror drive portion for rotating the movable mirror on an axis almost parallel to the recording face and shaking a light beam radiated from the objective lens onto the recording face in the radial direction. The mirror drive portion rotates the movable mirror on an axis almost parallel to an optical axis extending from the detection optical unit or on an axis almost parallel to a reflecting face of the movable mirror. Reflecting axes of the reflecting face are disposed on the same plane parallel to the recording face.

1 Claim, 10 Drawing Sheets

OPTICAL BEAM SYSTEM FOR OPTICAL DISK DRIVES

BACKGROUND OF THE INVENTION

1. Field of the Invention

The present invention relates to an optical system including a movable mirror for tracking corrections which is used in a memory apparatus and the like using a magneto-optical disk, and more particularly to an optical system which is thin and compact and in which optical components are effectively arranged.

2. Description of the Related Art

A typical optical system uses a movable mirror and a drive portion (galvano-mirror) for the mirror so as to reproduce and record information with light beams. This kind of optical system is mainly used in a memory device which uses a magneto-optical disk.

FIGS. 15 and 16 show arrangement examples of a conventional optical system using a galvano-mirror.

As shown in FIG. 16, a galvano-mirror $G_1$ drives a movable mirror 50. Numerals 50a, 51 and 52 denote a reflecting face of the movable mirror 50, a holder for supporting the movable mirror 50 and a coil wound around the peripheral surface of the right half portion of the holder 51 in the figure, respectively. The holder 51 is connected to the leading end of a support 53a through an elastic member 55, for example, a rubber. The support 53a is integrally connected to a magnetic yoke 53 which is U-shaped and inside of which a pair of magnets 54 are fixed. The magnets 54 are located opposite to upper and lower sides of the coil 52 so that opposite poles of the magnets 54 are opposite to the upper and lower sides of the coil 52, respectively. Therefore, when electric power is supplied to the coil 52, the holder 51 and the movable mirror 50 are rotated in the α direction due to currents flowing on the upper and lower sides of the coil 52 and the magnetic poles of the magnets 54. The holder 51 is made rotatable by the deformation of the shape of the elastic member 55, and the center M—M of rotation of the holder 51 corresponds to an axial line passing through the elastic member 55.

In an optical system shown in FIG. 15, a laser beam emitted from a semiconductor laser 4 in a detection optical unit A mounted in a fixed portion is changed into a parallel beam by a collimating lens 5. The parallel beam is reflected by a reflecting face 50a of a galvano-mirror and a reflecting prism 2b and transmitted to a movable unit B. The movable unit B moves along a magneto-optical disk D and in the radial direction of the disk D. The light beam is reflected by a reflecting prism 2a in the perpendicular direction and condensed by an objective lens 1, thereby forming a micro spot S on a recording face of the disk D. The reflected beam from the disk D returns in a path through which the beam reached the disk D, is reflected by a beam splitter 7 in the perpendicular direction and detected by an unillustrated light receiving detection optical system.

In the conventional arrangement example shown in FIG. 16, the laser beam emitted from a semiconductor laser 4 is reflected upward by a reflecting prism 3 and by the reflecting face 50a of the galvano-mirror and transmitted to a reflecting mirror 2a in a movable unit B.

Referring to FIGS. 15 and 16, the reflecting face 50a is rotated on the axis M—M in the α direction due to the current applied in the coil 52. This rotation displaces the reflecting optical axis of the reflecting face 50a. Then, the micro spot S formed on the disk D is moved in the radial direction, and thus a tracking correction operation is performed.

In the above conventional optical system using a galvano-mirror, the rotation axis M—M of the movable mirror 50 extends parallel to the reflecting face 50a and in the tangential direction of the disk D. Therefore, it is necessary to transmit the light beam toward the movable unit B after reflecting the light beam upward by the reflecting face 50a, as shown in FIG. 15, or by the reflecting prism 3 as shown in FIG. 16. This makes it necessary to arrange the optical system in the detection optical unit A mounted in the fixed portion so as to have two tiers, and as a result, the optical system is made thicker. Furthermore, as shown in FIG. 16, since the drive portion of the galvano-mirror is disposed to be inclined, the optical system is made even thicker. In addition, since the incident optical axis into the reflecting face 50a and the reflecting optical axis of the same are disposed along the meridian plane (a plane along the sheet planes including FIGS. 15 and 16), it is required that the optical axis of the detection optical unit A extend in the radial direction (the right direction in FIGS. 15 and 16). Therefore, the length of a portion of the detection optical unit A projecting to the right in the figures is increased, and the diameter of the disk D and the length of the detection optical unit A are added to the width of the whole system. This prevents the system from being made thinner and more compact.

For example, an optical system shown in FIG. 17 (a top view thereof) is disclosed in Japanese Utility Model No. Sho 63-12335. This optical system performs a tracking correction operation by rotating a movable mirror 50 on an axis M perpendicular to a disk D, horizontally displacing a light beam transmitted from a detection optical unit A by a reflecting face 50a, transmitting the light beam to an objective lens 1 by a reflecting mirror 2a, and displacing the detected light in the radial direction with respect to the disk D. In this arrangement, it is not necessary to vertically transmit the reflected light as shown in FIGS. 15 and 16, and it is thus possible to make the system thinner. However, since it is required in this arrangement to extend the optical axis of the optical components, such as a wavelength plate 8 and a Wollaston prism 9, which constitute the detection optical unit A for transmitting the light beam to the movable mirror 50, in the radial direction, the width W of the system in the radial direction is large, as is the case with the widths of the systems shown in FIGS. 15 and 16. Furthermore, when a movable unit B is moved in the radial direction in the arrangement shown in FIG. 17, since it is necessary to move the movable mirror 50 in the radial direction together with the movable unit B, the construction of the system is complicated. In addition, if the movable mirror 50 and a drive portion for the movable mirror 50 are mounted in the movable unit (a pickup) B, the pickup is too heavy to follow a high speed access.

SUMMARY OF THE INVENTION

The present invention aims to solve the above problems. It is, therefore, an object of the present invention to provide an optical system including a movable mirror which is thin and compact and in which optical components are arranged more efficiently when the movable mirror is used, and having a movable unit reduced in weight.

An optical system of the present invention comprises an objective lens which moves along a recording face of an optical disk in the radial direction of the optical disk so that an optical axis thereof is almost perpendicular to the recording face of the optical disk, a reflecting mirror for moving together with the objective lens and having a reflecting axis with respect to the optical axis of the objective lens which extends in the radial direction of the optical disk, a detection optical unit having a light emitting portion and a light receiving portion and disposed in a fixed part, a movable mirror located in the position which links the optical axis extending almost parallel to the recording face of the optical disk from the detection optical unit and the reflecting axis of the reflecting mirror and disposed to incline with respect to both of the optical axes, and a mirror drive portion for rotating the movable mirror on an axis almost parallel to the recording face of the optical disk and displacing a light beam radiated from the objective lens onto the recording face of the optical disk in the radial direction.

In the above optical system, the mirror drive portion rotates the movable mirror on an axis almost parallel to the optical axis extending from the detection optical unit or on an axis almost parallel to the reflecting face of the movable mirror.

According to the above system, a light beam transmitted from the movable mirror in the radial direction is sent to the objective lens through the reflecting mirror and the tracking correction of the detected light is performed on the side of the fixed portion. At this time, the reflecting direction of the light beam with respect to the movable mirror is almost parallel to the recording face of the optical disk and the movable mirror rotates on an axis almost parallel to the recording face of the optical disk. Therefore, it is possible to arrange the detection optical unit and the optical axis of the reflecting mirror parallel to the recording face of the optical disk, and thus the height of the system is not great, unlike in the prior art. Furthermore, since the optical axis of the detection optical unit extends in the direction perpendicular to the radial direction, the detection optical unit does not protrude in the radial direction and the system can be compact.

DESCRIPTION OF THE PREFERRED EMBODIMENTS

Preferred embodiments of the present invention will now be described with reference to the accompanying drawings.

Figure 1:
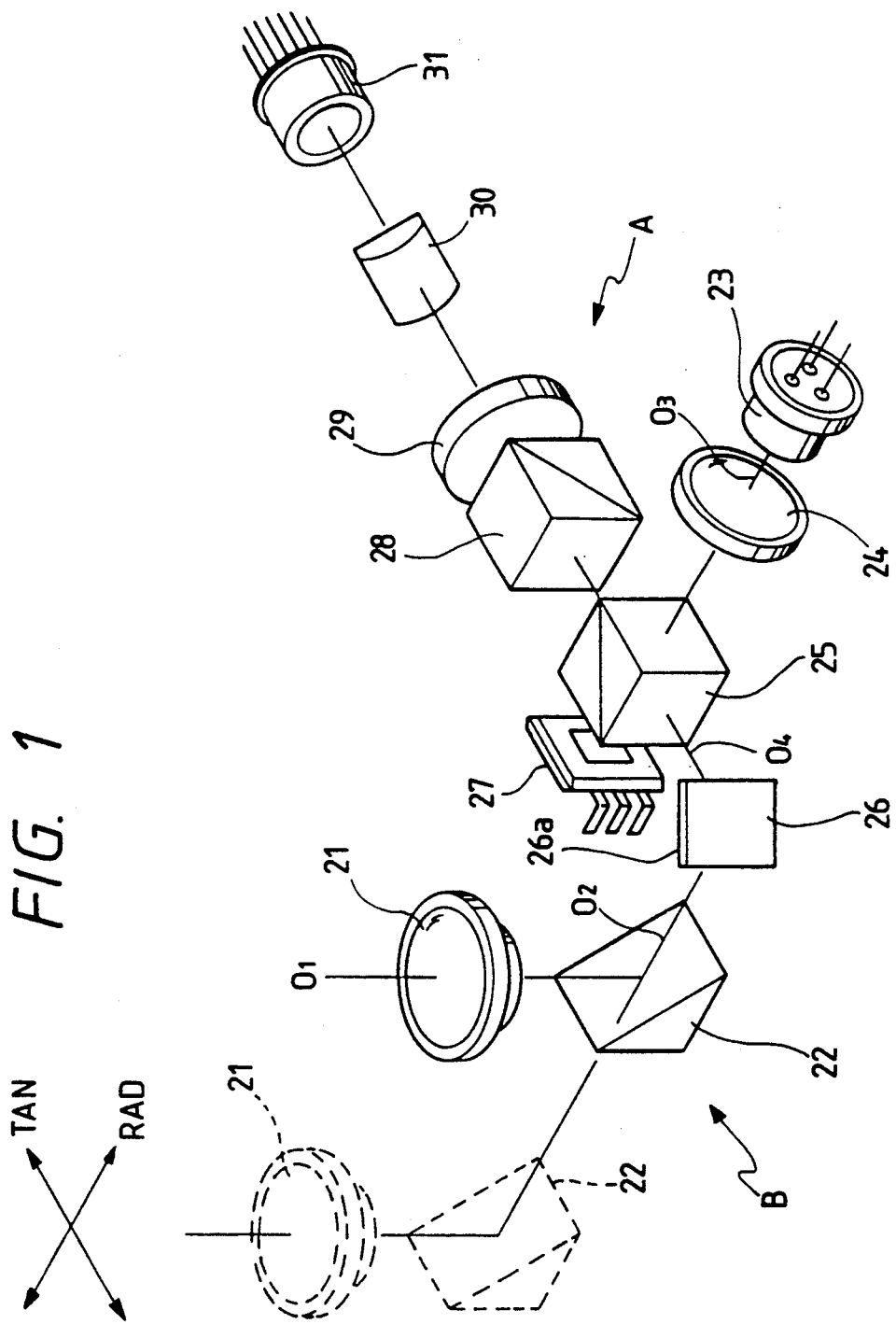
FIG. 1 is a perspective view showing the arrangement of components of an optical system according to the present invention.
Figure 2:
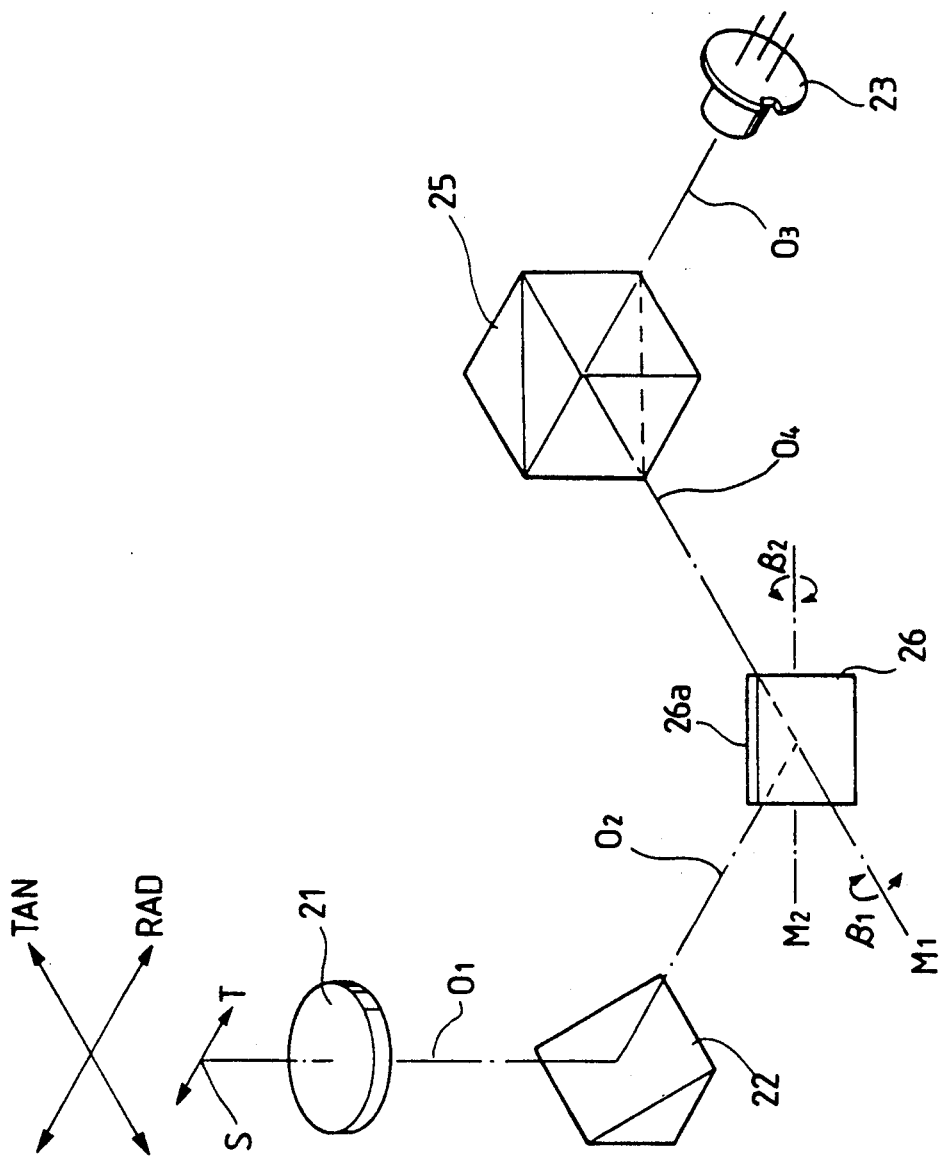
FIG. 2 is a partial perspective view showing a rotation movement of a movable mirror.
Figure 3:
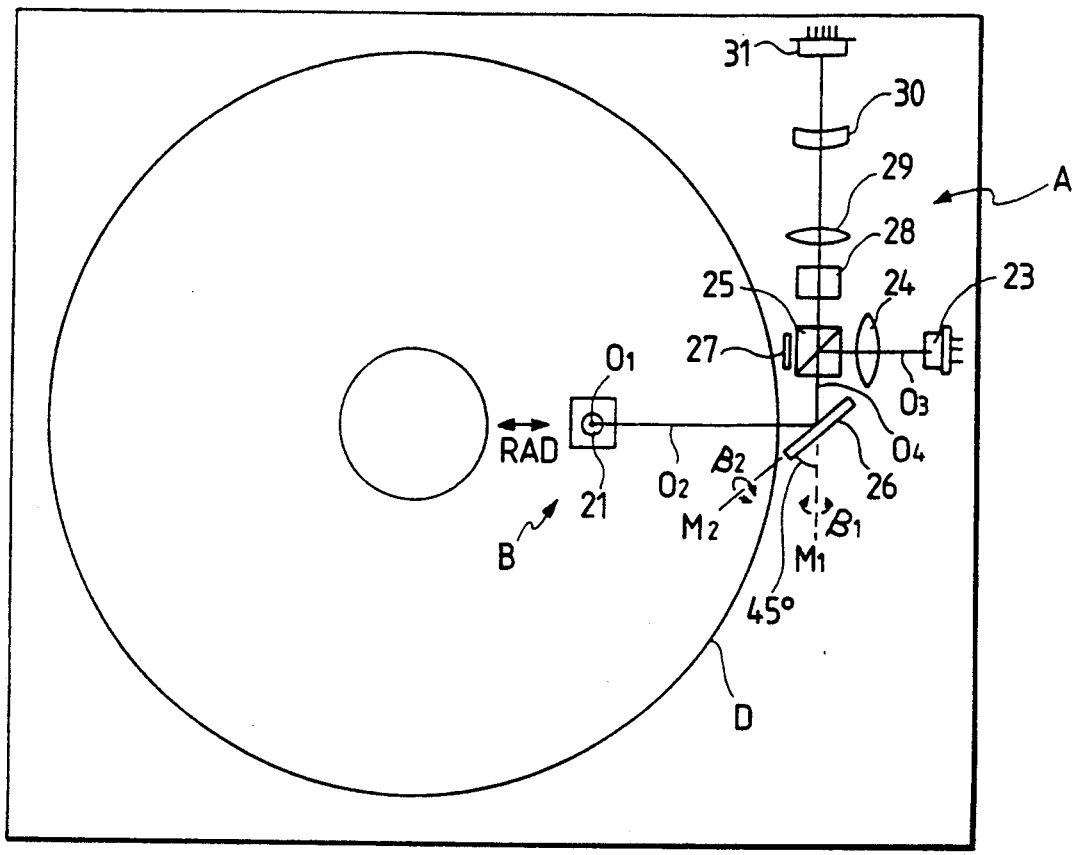
FIG. 3 is a top view showing the structure of a magneto-optical disk memory device in which the optical system of the present invention is mounted.

FIG. 1 is a perspective view showing the arrangement of an optical system including a movable mirror and used as a memory device for a magneto-optical disk, FIG. 2 is a partial perspective view showing the movement of the movable mirror, and FIG. 3 is a top view showing the arrangement of the optical system shown in FIG. 1.

In the optical system shown in FIG. 1, an objective lens 21 and a reflecting prism 22 are mounted in a movable unit B. As shown in FIG. 3, the movable unit B moves along a recording face of a magneto-optical disk D in the radial direction of the disk. As a drive source for moving the movable unit B, for example, a linear motor device is used. An optical axis $O_1$ of the objective lens 21 is perpendicular to the recording face of the magneto-optical disk D. The reflecting prism 22 is located so as to reflect light (an optical axis $O_2$), which extends almost parallel to the recording face of the magneto-optical disk D and directed in the radial direction of the magneto-optical disk D, in the direction of the optical axis $O_1$ of the objective lens 21. An unillustrated focus correcting mechanism is also mounted in the movable unit B and slightly moves the objective lens 21 so that the objective lens 21 is focused on the recording face of the magneto-optical disk D.

A light emitting device 23 composed of a semiconductor laser is mounted in a detection optical unit A disposed in a fixed portion. A laser beam (an optical axis $O_3$) emitted from the light emitting device 23 passes a collimating lens 24 and is reflected by a beam splitter 25 in the perpendicular direction (an optical axis $O_4$), and then, reflected by a reflecting face 26a of a movable mirror 26 in the direction of the above optical axis $O_2$. Numeral 27 denotes a monitoring light receiving device.

In a light receiving system in the detection optical unit A, the light beam reflected from the magneto-optical disk D returns through the optical axis $O_2$ and is reflected by the movable mirror 26 in the direction of the optical axis $O_4$. Then, the light beam is received by a light receiving device (pin photodiode) 31 through the beam splitter 25, a Wollaston prism 28, a plano-concave lens 29 and a cylindrical lens 30.

In this system, the reflected light from the movable mirror 26 propagates along the optical axes $O_2$ and $O_4$ and the optical axes of the movable unit B and the detection optical unit A disposed in the reflecting directions are disposed on a single plane parallel to the recording face of the disk D. Therefore, the component of the optical system are horizontally arranged except that the objective lens 21 is located above the components. As a result, the whole system can be compact.

The movable mirror 26 together with the mirror drive portion constitutes a galvano-mirror, and is rotated by the mirror drive portion. The center of rotation of the movable mirror 26 is an axis $M_1$ (parallel to the optical axis $O_4$) or an axis $M_2$ (parallel to the reflecting face 26a) shown in FIG. 2. Each of the axes extends in the direction along the recording face of the magneto-optical disk D.

The movable mirror 26 is rotated on the axis $M_1$ in the direction $\beta_1$ within a range of a narrow angle. Thereby, the optical axis $O_2$ is displaced, a spot formed on the recording face of the magneto-optical disk D is displaced in the radial (RAD) direction, that is, along the meridian plane, and a tracking correction operation is performed. In this case, the reflecting face 26a of the movable mirror 26 is disposed obliquely with respect to the axis $M_1$ which is the center of rotation. (The reflecting face 26a is disposed to incline at an angle of approximately 45° in this embodiment. See FIG. 3.) This inclination does, not obstruct a tracking correction operation performed by displacing the optical axis of the light transmitted from the beam splitter 25 and so on in the direction of the meridian plane.

Figure 11:
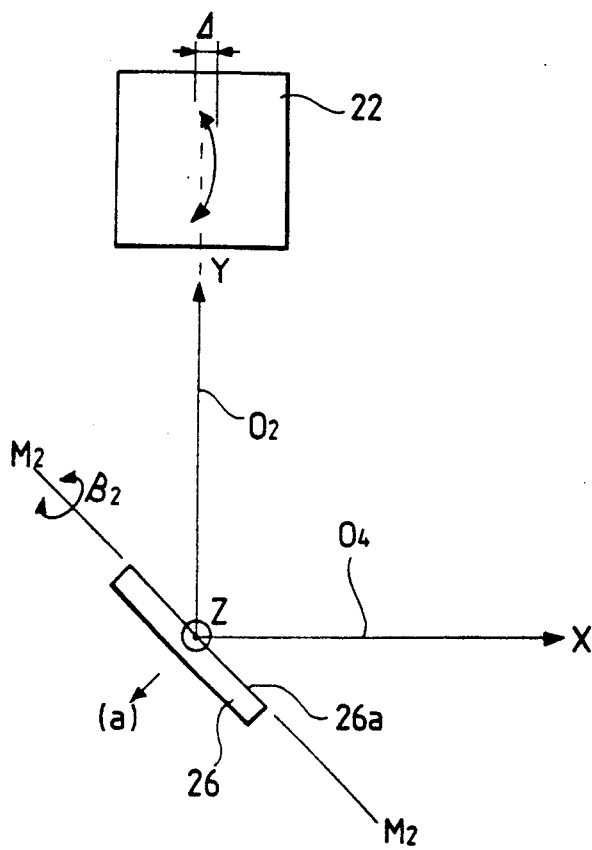
FIG. 11 is a top view showing the placement angle of a movable mirror in the second embodiment.
Figure 12:
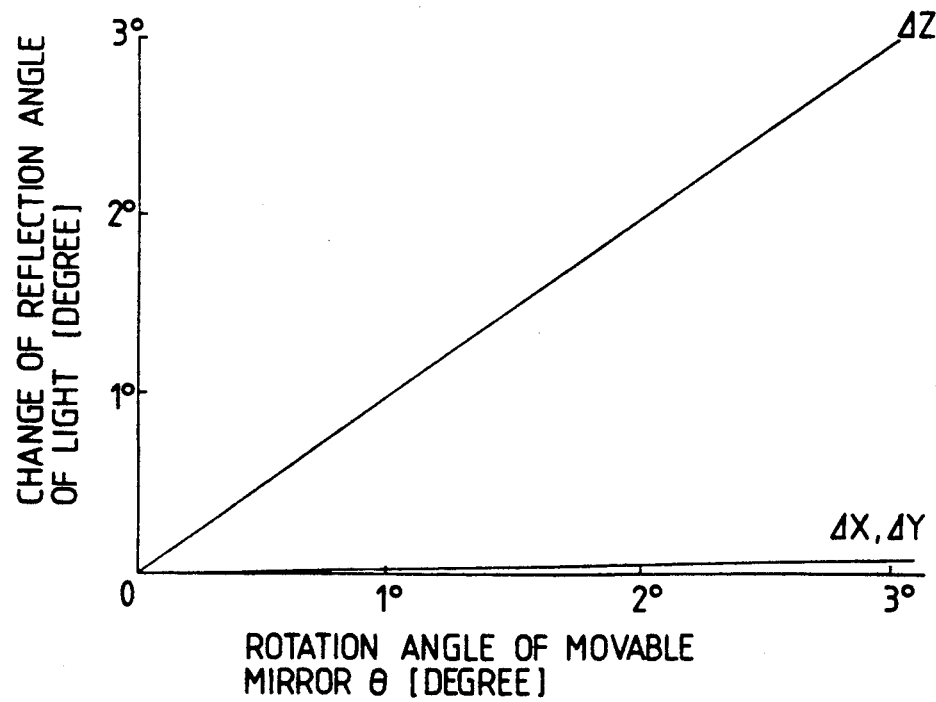
FIG. 12 is a chart showing the rotation angle of the movable mirror and the displacement amount of a reflected light beam in coordinate directions in relation to the rotation angle.

In a second embodiment, the movable mirror 26 is rotated on the axis $M_2$ in the direction $\beta_2$ within a range of a narrow angle. Thereby, the optical axis $O_2$ is displaced, a spot formed on the recording face of the magneto-optical disk D is displaced in the radial direction, and a tracking correction operation is performed. However, since the movable mirror 26 rotates on the axis $M_2$ almost parallel to the reflecting face 26a in this second embodiment, the spot formed on the magneto-optical disk D is displaced not only in the radial direction (tracking direction) but also in the tangential direction by a small amount $\Delta$. The degree to which the displacement amount $\Delta$ influences the tracking correction operation is shown in a graph of FIG. 12. The direction of the optical axis $O_4$ in FIG. 11 corresponds to the X axis, the direction of the optical axis $O_2$ corresponds to the Y axis, and the coordinates at right angles to the X and Y axes correspond to the Z axis. When the reflecting face 26a of the movable mirror 26 is rotated on the axis $M_2$, the rotation angle $\theta$ is shown on the horizontal axis in FIG. 12 and the amount of change in reflection angle of the light is shown on the vertical axis. As shown in the graph of FIG. 12, the change amounts $\Delta X$ and $\Delta Y$ of the reflection angle in the directions of the X and Y axes (related to the movement of the spot in the tangential direction) are extremely small compared with the change amount $\Delta Z$ (related to the amount of movement of the spot in the tracking correction direction). When it is assumed that the rotation angle $\theta$ of the movable mirror 26 is approximately 3°, the changes $\Delta X$ and $\Delta Y$ of the reflection angle in the directions of the X and Y axes each are 3% of $\theta$ and have no influence on the tracking correction operation.

Although the graph in FIG. 12 shows the case in which the axis $M_1$ is on the same plane as the reflecting, face 26a of the movable mirror 26, even if the axis $M_1$ deviates from the reflecting face 26a by a certain distance in the direction of (a), if the distance is small, the tracking operation is not influenced at all.

Figure 15:
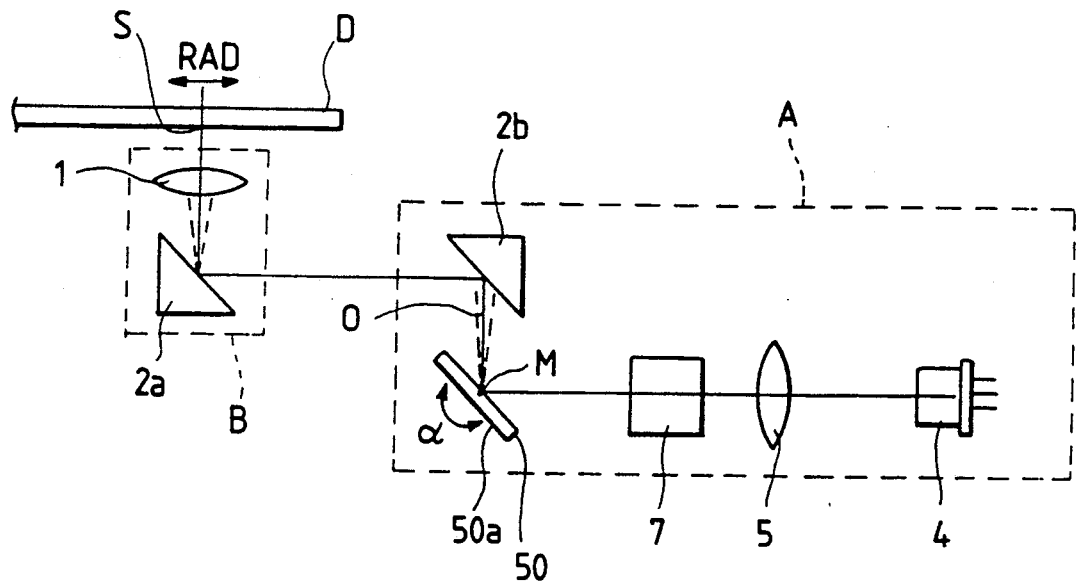
FIGS. 15 and 16 are side views of conventional optical systems each using a movable mirror.
Figure 16:
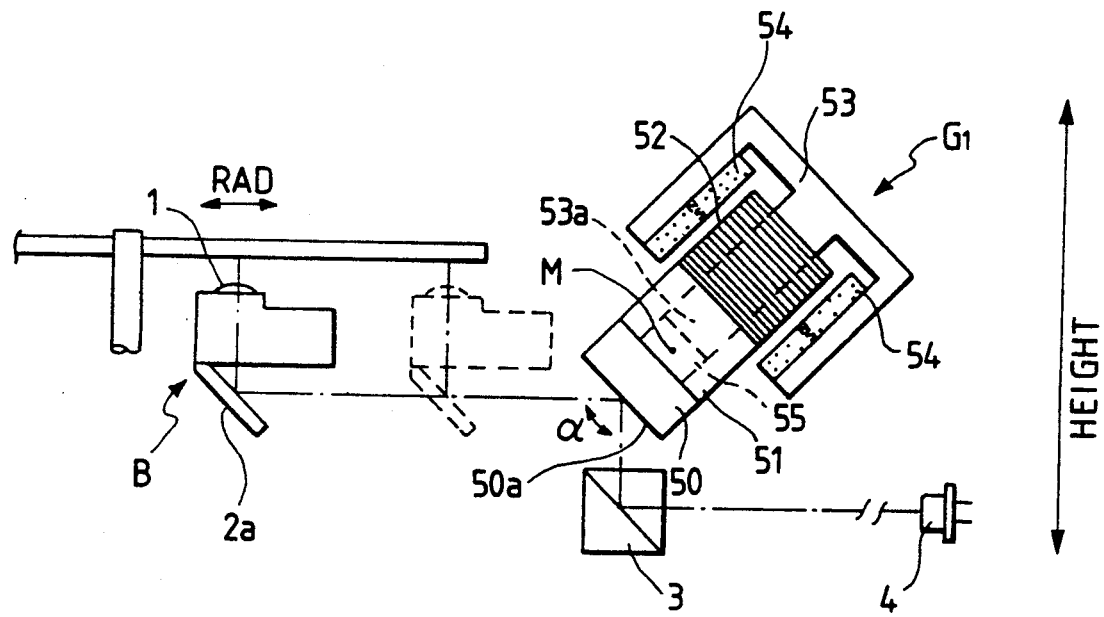

As described above, in the present invention, since the reflecting axes $O_2$ and $O_4$ of the reflecting face 26a of the movable mirror 26 are disposed on a plane parallel to the recording face of the magneto-optical disk D and the reflecting face 26 is rotated on the axis $M_1$ or $M_2$, it is not necessary for the optical system to be divided into upper and lower parts and to have the optical axes extending in the vertical direction like the prior art shown in FIGS. 15 and 16. Furthermore, it is unnecessary to dispose the galvanometer mirror to incline along the height of the system as shown in FIG. 16. Therefore, the system can be made compact.

Figure 17:
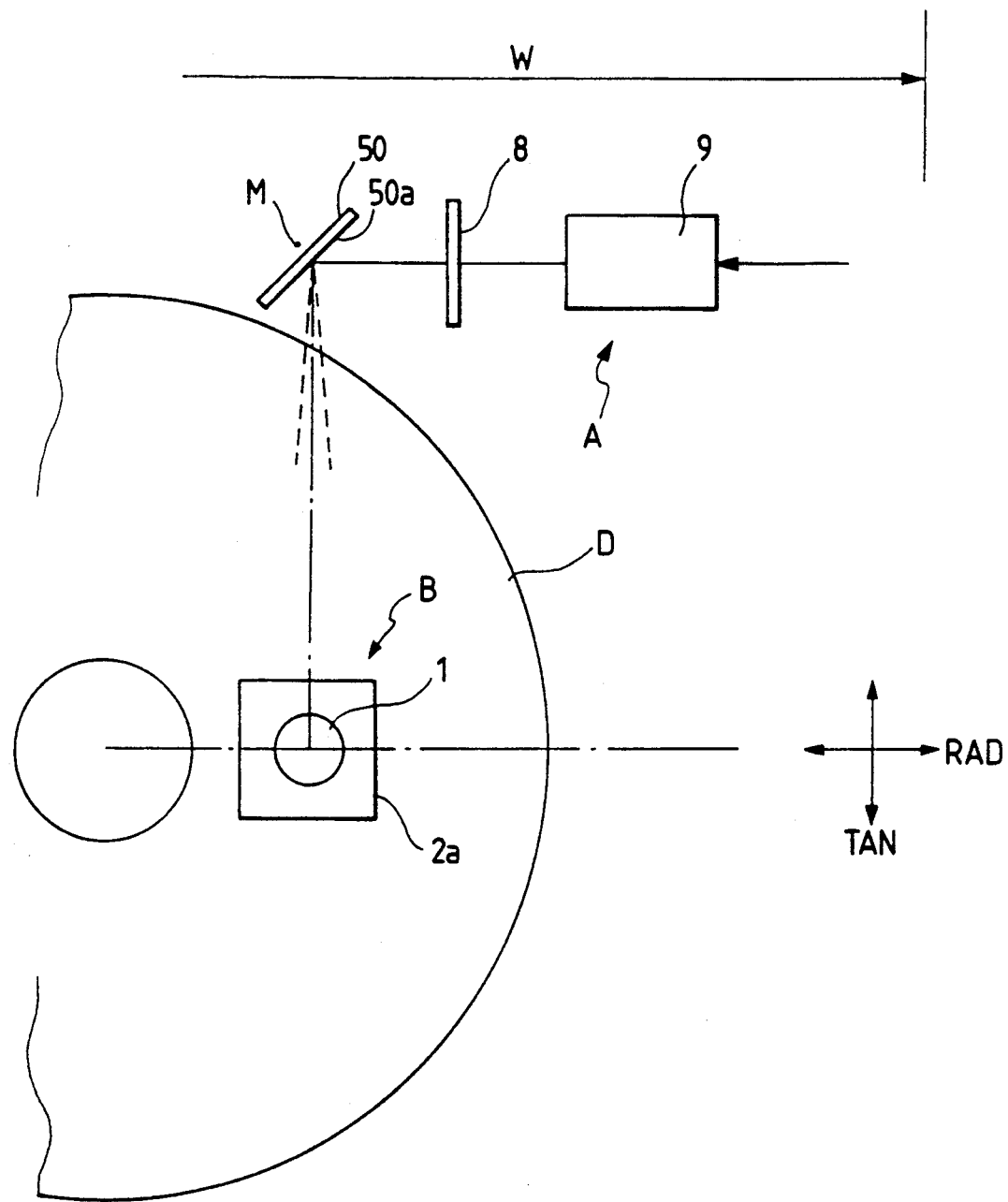
FIG. 17 is a top view of another conventional optical system.

Furthermore, since the optical axis $O_2$ extends in the radial direction, the direction of light reflected from the movable mirror 26 is parallel with the movement direction of the movable unit B. Therefore, it is unnecessary to move the movable mirror 26 together with the movable unit B like the prior art shown in FIG. 17. Still furthermore, since the optical axis $O_4$ extending toward the detection optical unit A is parallel to the tangential direction from outside the disk D, components of the detection optical unit A do not protrude in the radial direction and the width of the system can be minimize. FIG. 3 shows the relation of size between the optical system of the present invention and a memory system which includes a 3.5 inch magneto-optical disk D when the optical system is actually mounted in the memory apparatus. As shown FIG. 3, the detection optical unit A does not extensively protrude to the right in the figure and all the components vertically arranged in the figure are contained in the diameter of the disk D. Therefore, the system can be designed such that the size of the system is a little larger than the outer diameter of the 3.5 inch disk, and can be made compact.

The structure of the galvano-mirror composed of the movable mirror and the mirror drive portion for driving the movable mirror which is used in the above optical system will now be described.

Figure 4:
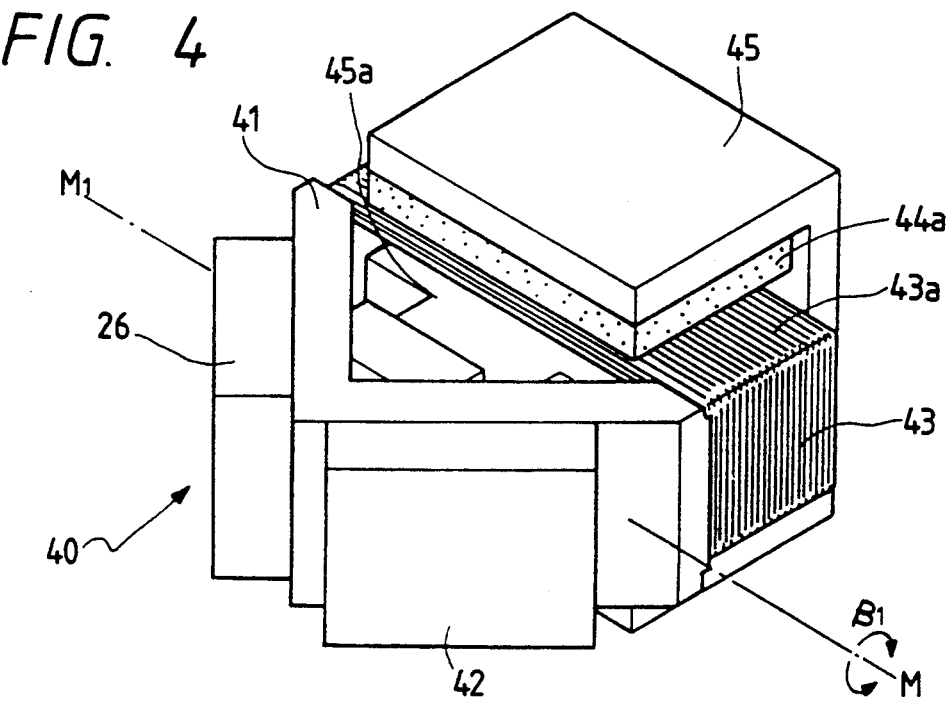
FIG. 4 is a perspective view of a galvano-mirror used in a first embodiment.
Figure 5:
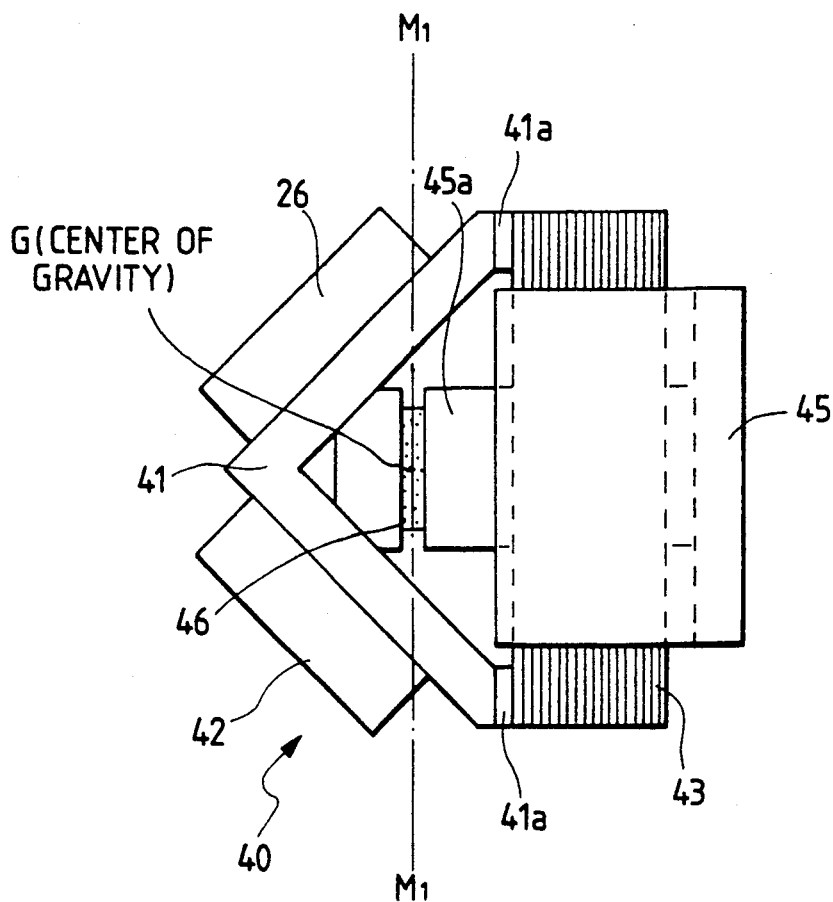
FIG. 5 is a top view of the galvano-mirror.
Figure 6:
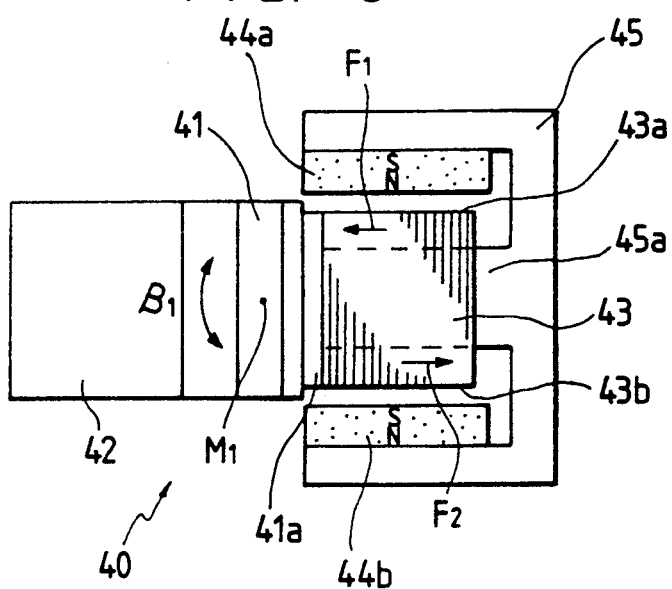
FIG. 6 is a side view of the galvano-mirror.
Figure 7:
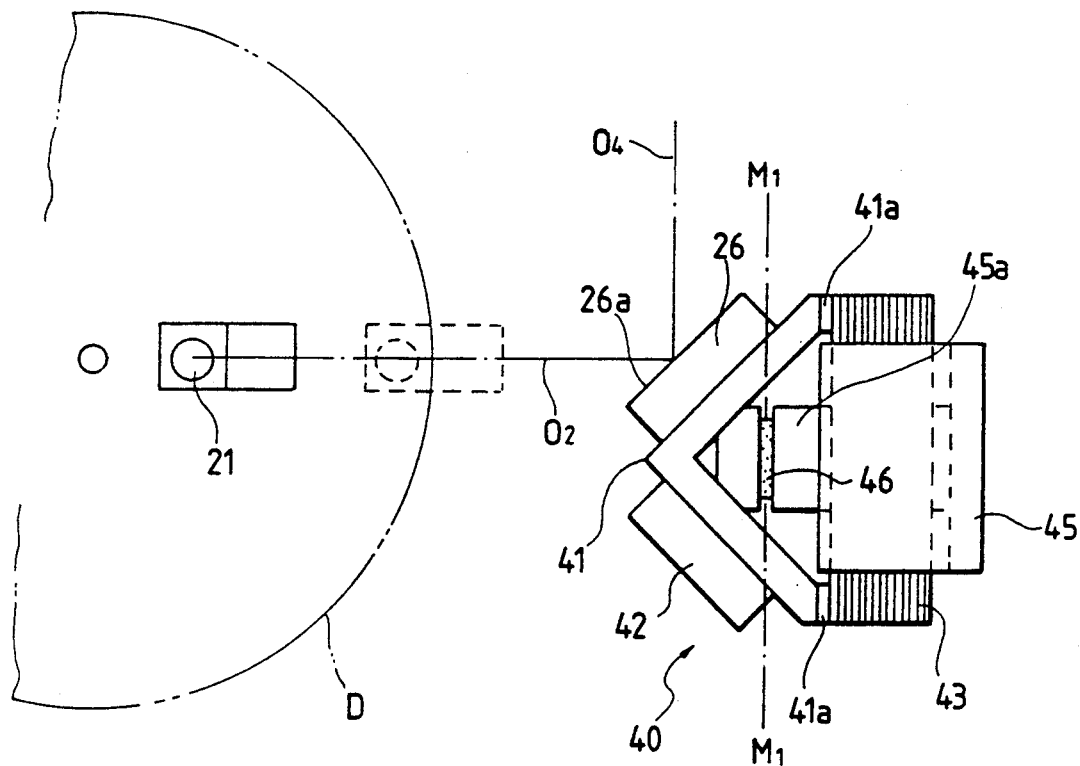
FIGS. 7 and 8 are a top view and a side view each showing the placement of the galvano-mirror.
Figure 8:
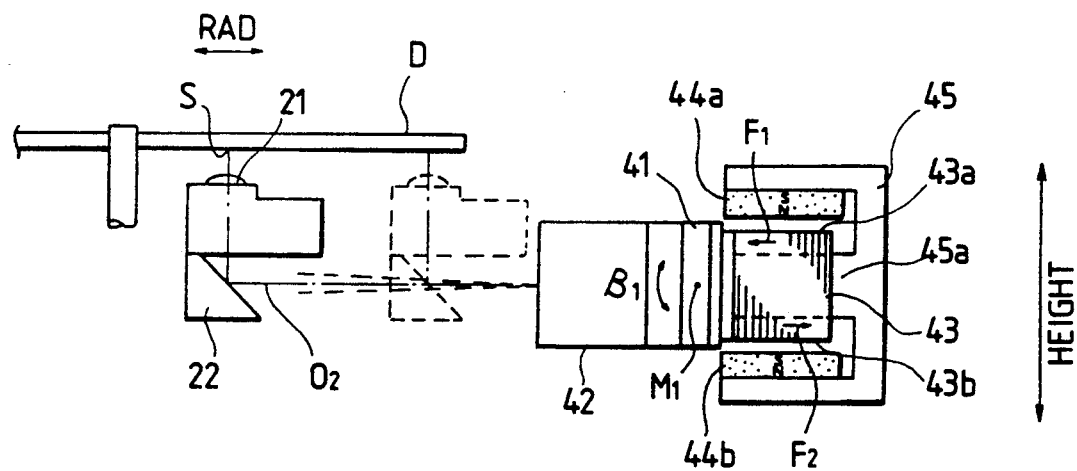

FIGS. 4 to 8 show the galvano-mirror which is used in the first embodiment and rotates the movable mirror 26 on the axis $M_1$. FIGS. 4, 5 and 6 are a perspective view, a top view and a side view of the galvano-mirror, respectively. FIG. 7 is a top view showing the placement of the galvano-meter mirror with respect to the disk, and FIG. 8 is a side view showing the placement.

A galvano-mirror 40 is constructed by fixing a movable mirror 26 to a holder 41 to incline with respect to the center of rotation $M_1$-$M_1$. A balancer 42 is fixed to an inclined face of the holder 41 opposite to a face to which the movable mirror 26 is fixed so as to balance the weight of the holder 41. A coil 43 is wound between both legs 41a and 41a of the holder 41. As shown in FIG. 6, upper and lower faces 43a and 43b of the coil 43 function as driving force generation faces, and magnets 44a and 44b are opposite to the upper and lower faces 43a and 43b and fixed to a magnetic yoke 45. A support 45a is disposed in the center of the yoke 45, passes through the coil 43 and extends to the left in the figures. The holder 41 is connected to the leading end face of the support 45a through an elastic member 46.

As shown in FIG. 6, poles of the magnets 44a and 44b which are opposite to each other, are disposed opposite to the upper and lower faces 43a and 43b of the coil 43. When directions of the upper and lower faces 43a and 43b are reverse to each other. Therefore, electromagnetic forces in directions indicated by the arrows $F_1$ and $F_2$ shown in FIG. 6 or in directions reverse to the above directions are generated in relation to the current directions and the poles of the magnets 44a and 44b, and the holder 41 is driven in the direction of the arrow $\beta_1$. At this time, the movement of the holder 41 in the direction of the arrow $\beta_1$ is allowed by the deformation of the elastic member 46. In other words, the electromagnetic forces in the directions indicated by the arrows $F_1$ and $F_2$ shown in FIG. 6 or in their reverse directions act on the coil 43, and a moment in the direction of the arrow $\beta_1$ whose center is a virtual axis $M_1$ almost parallel to the optical axis $O_4$ in FIG. 1 is applied to the electromagnetic forces. As a result, the movable mirror 26 which is disposed to incline with respect to the above virtual axis $M_1$ rotates on the virtual axis $M_1$ only in the direction $\beta_1$. The galvano-mirror 40 used in the first embodiment is thus characterized in that the reflecting face 26a of the movable mirror 26 is mounted to incline with respect to the center of rotation $M_1$–$M_1$. The angle of inclination is 45° in the illustrated embodiment.

The galvano-mirror 40 is constructed so that the center of gravity G of the whole movable unit composed of the holder 41, the movable mirror 26, the balancer 42 and the coil 43 is located on the center of rotation $M_1$–$M_1$. Therefore, the movable unit is not inclined by gravity. In order to set the position of the center of gravity G, a balancer may be fixed to an end of the leg 41a of the holder 41 (to the right end in FIG. 5), or the coil 43 may be fixed after adjusting the weight balance of the movable unit by moving the coil 43 to the right and left (the right and left in FIG. 5) with respect to the leg 41a. Since it is possible to prevent the movable unit from inclining due to its own weight or the angle of inclination from changing depending upon the placement of the system by thus setting the center of gravity G, a troublesome operation for correcting the inclination in the prior art is unnecessary. To whatever degree the system inclines with respect to the direction of gravity, the movable mirror 26 does not incline due to its own weight.

As shown in FIGS. 7 and 8, the galvano-mirror 40 is disposed so that the reflecting face 26a of the movable mirror 26 is at an angle of approximately 45° with the optical axes $O_2$ and $O_4$.

Although the reflecting face 26a of the movable mirror 26 inclines at an angle of approximately 45° with respect to the center of rotation $M_1$–$M_1$ in the above first embodiment, the angle of inclination of the present invention is not limited to the above angle, and it is possible to mount the reflecting face 26 at various angles with respect to the center of gravity and to freely set the angles of the incident beam and the reflected beam, which are expressed by the optical axes $O_1$ and $O_2$ in FIG. 1, to some extent in the three-dimensional direction.

In the case of the galvano-mirror 40 shown in FIGS. 4 to 8, since the holder 41 and the support 45a are connected through the elastic member 46 and the holder 41 is rotated in the direction of $\beta_1$ by the deformation of the elastic member 46, the position of the center of rotation $M_1$–$M_1$ is a little unstable. In order to stabilize the position of the center of rotation $M_1$–$M_1$, the holder 41 and the support 45a may be composed of a hinge and a bearing mechanism so that the holder 41 can rotate on the hinge on a stable axis extending along $M_1$.

Figure 9:
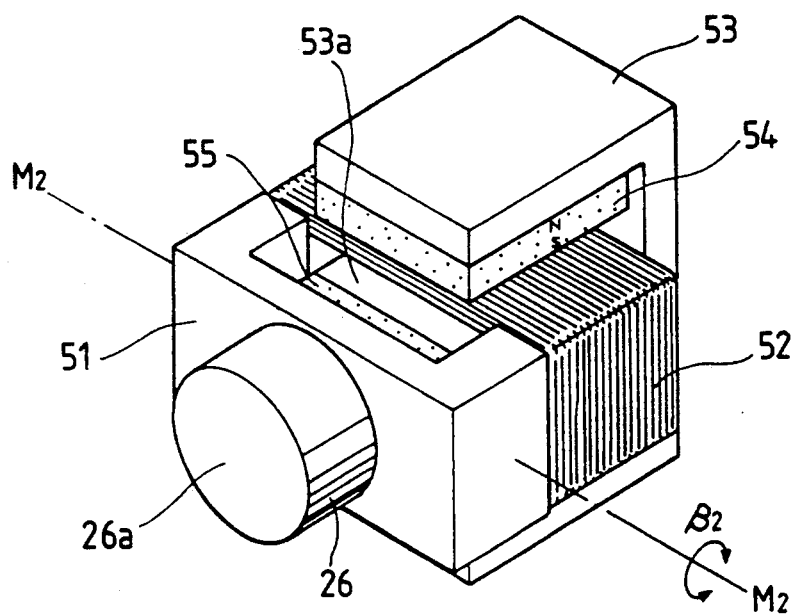
FIG. 9 is a perspective view of a galvano-mirror used in a second embodiment.

A galvano-mirror for rotating the movable mirror 26 on the axis $M_2$ in the direction of $\beta_2$ in the second embodiment is shown in a perspective view of FIG. 9.

In this galvano-mirror, a coil 52 is wound around the peripheral surface of the right half of a holder 51 for supporting the movable mirror 26. The holder 51 is connected to a leading end of a support 53a through an elastic member 55, such as rubber. The support 53a is integrally connected to a magnetic yoke 53 which is U-shaped and inside which a pair of magnets 54 are fixed. The magnets 54 are located opposite to upper and lower sides of the coil 52 so that opposite poles of the magnets 54 are opposite to the upper and lower sides. Therefore, when electric power is supplied to the coil 52, the holder 51 and the movable mirror 26 are rotated on the axis $M_2$–$M_2$ in the $\beta_2$ direction by currents flowing on the upper and lower sides of the coil 52 and the magnetic poles of the magnets 54.

Figure 10:
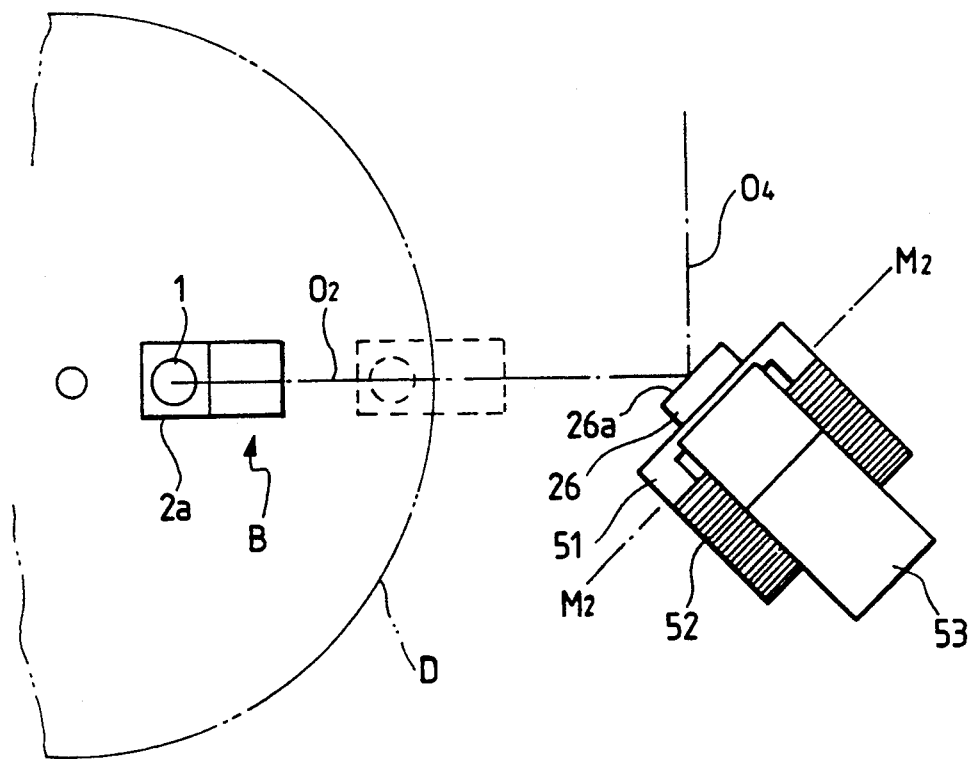
FIG. 10 is a top view showing the placement of the galvano-mirror.

In the second embodiment, as shown in FIG. 10, the reflecting face 26a of the movable mirror 26 and the rotation axis $M_2$–$M_2$ are located at an angle of almost 45° with respect to the optical axes $O_2$ and $O_4$.

Figure 13A:
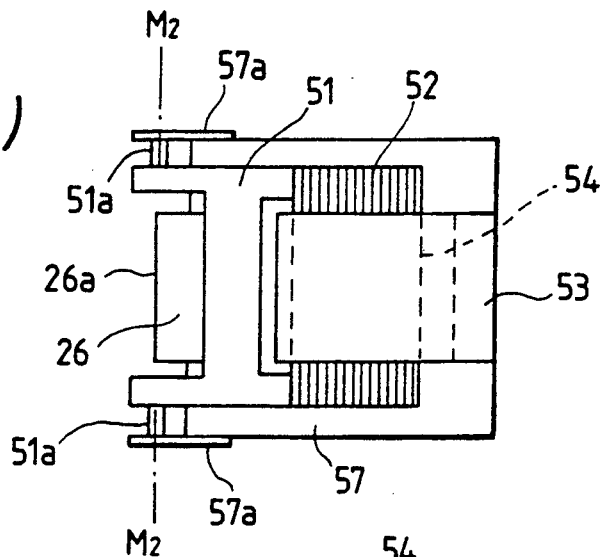
FIG. 13(A) is a top view of a galvano-mirror having another structure and used in the second embodiment.
Figure 13B:
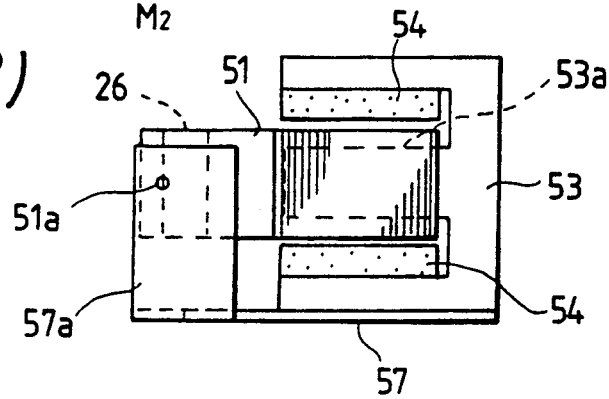
FIG. 13(B) is a side view of the galvano-mirror.

FIG. 13 shows another structure of the galvano-mirror used in the second embodiment. FIGS. 13(A) and (B) are a top view and a side view of the galvano-mirror.

The holder 51 for supporting the movable mirror 26 is rotatably supported in a bracket 57a of a support base 57 through a shaft 51a. The coil 52 is wound on the holder 51. The yoke 53 is mounted on the support base 57 and magnets 54 opposite to the coil 52 are supported by the yoke 53. The holder 51 and the movable mirror 26 rotate on the shaft 51a in this example. The center $M_2$–$M_2$ of rotation on the shaft 51a is located on the same plane as the reflecting face 26a of the movable mirror 26. Since the movable mirror 26 rotates on the axis $M_2$–$M_2$ on the same plane as the reflecting face 26a of the movable mirror 26 in this embodiment, the rotation of the movable mirror 26 is similar to that shown in FIG. 11 and it is possible to minimize the change amounts $\Delta X$ and $\Delta Y$ of the reflected light in the directions of the X and Y axes in the rotation. Although it is preferable to mount a weak spring for holding the holder 51 in a neutral position, it is also preferable that the shaft 51a is integrally formed with the holder 51, the holder 51 is rotated by torsion transformation and the torsion elastic force functions as a spring for holding the holder 51 in a neutral position. Furthermore, since the coil 52 is wound on the right side of the shaft 51a and it is difficult to balance the weight around the shaft 51a, a small balancer may be disposed at the left end of the holder 51.

Figure 14:
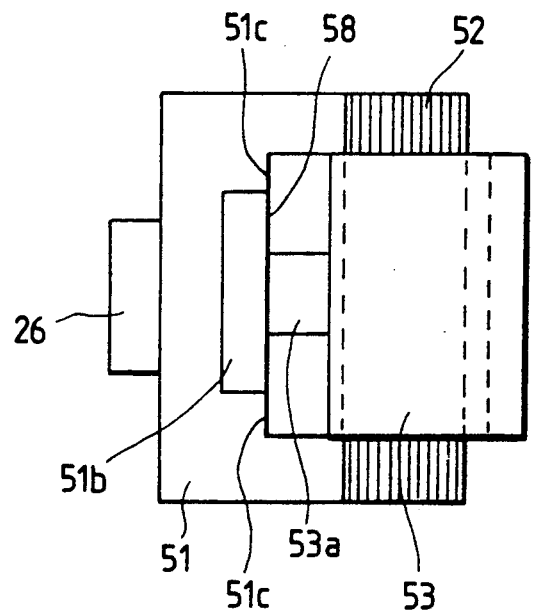
FIG. 14 is a top view of a galvano-mirror having still another structure.

FIG. 14 shows a variation of the galvano-mirror shown in FIG. 9. A plate spring 58 is mounted between both side faces 51c of a slot 51b in the holder 51 and a projection 53a of the yoke 53 instead of the elastic member 55 shown in FIG. 9. The holder 51 is rotated by the torsion transformation of the plate spring 58 and can return into a neutral position due to the elastic force of the plate spring 58. The plate spring 58 makes it possible to prevent an unnecessary swing of the holder 51 and is more stable than the elastic member 55 in FIG. 9.

As described above, according to the present invention, since the optical axes of the movable mirror in the reflection direction are located parallel to the recording face of the disk, it is possible to minimize the height of the optical system and make an apparatus including the optical system compact. Furthermore, since the detection optical unit extends parallel to the tangential direction, the detection optical unit does not protrude in the radial direction and the width of the apparatus can be minimized.

In addition, since the optical axis extending from the movable mirror enters the reflecting mirror of the movable unit in the radial direction, the movable mirror can be disposed in a fixed portion, and a tracking correction operation can be performed in a minimal movable angle of the movable mirror.

What is claimed is:

1. An optical beam system for optical disk drives, comprising:

an objective lens for moving along a recording face of an optical disk in a radial direction of said optical disk so that an objective lens optical axis thereof is substantially perpendicular to said recording face of said optical disk;

a reflecting mirror for moving together with said objective lens, said reflecting mirror reflecting light from said objective lens along a reflecting axis directed in a radial direction of said optical disk;

a detection optical unit having a light emitting portion and a light receiving portion disposed in a fixed part, said detection optical unit having an optical axis extending substantially parallel to said recording face of said optical disk, said optical axis and said reflecting axis lying in a common plane which is substantially parallel to said recording face;

a movable mirror disposed in a position which links said optical axis from said detection optical unit and the reflecting axis of said reflecting mirror and disposed inclined with respect to both of the optical axes; and a mirror drive portion for rotating said movable mirror on an axis substantially parallel to said recording face and to a reflecting face of said movable mirror, said mirror drive portion causing a beam spot projected by said objective lens onto said recording face of said optical disk to become displaced in the radial direction.

* * * * *